(12) United States Patent
Gay

(10) Patent No.: US 6,456,904 B1
(45) Date of Patent: Sep. 24, 2002

(54) METHOD AND DEVICE FOR GAUGING DISTANCE BETWEEN RACE CARS

(76) Inventor: Robert Gay, 135 W. Funderburg, Fairborn, OH (US) 45324

( * ) Notice: Subject to any disclaimer, the term of this patent is extended or adjusted under 35 U.S.C. 154(b) by 0 days.

(21) Appl. No.: 09/951,989

(22) Filed: Sep. 13, 2001

(51) Int. Cl.[7] .............................. G05D 1/00; G06F 7/00; G06F 17/10; G06F 17/18
(52) U.S. Cl. .................. 701/1; 701/93; 104/60; 104/140; 104/242; 104/53; 702/178; 324/178; 188/2 R; 188/32
(58) Field of Search .................. 701/1, 93; 104/60, 104/140, 242, 53; 702/178; 324/178; 188/2 R, 32

(56) References Cited

U.S. PATENT DOCUMENTS

| | | | | |
|---|---|---|---|---|
| 4,880,083 A | * | 11/1989 | Thompson | 188/2 R |
| 5,051,935 A | * | 9/1991 | Matty | 324/178 |
| 5,941,173 A | * | 8/1999 | Schier | 104/60 |

* cited by examiner

*Primary Examiner*—Yonel Beaulieu
*Assistant Examiner*—Ronnie Mancho
(74) *Attorney, Agent, or Firm*—R. William Graham

(57) ABSTRACT

A method and apparatus for winning a race without exceeding a maximum performance of a car, whereby maximum performance is based upon consecutive prior races. The method is comprised of determining an optimal distance by which a first car having a first performance should trail a second car having a second performance at a predetermined distance of 66 feet from a finish line on a race track having a fixed distance of 1320 feet whereby a racer uses optimal distance during a race to influence his or her rate of speed.

15 Claims, 5 Drawing Sheets

Calculation system using desk top computer

Step 1 - (Car A MP 26 in m/hr) x (predetermined multiplier M hr/m ft/sec) = car A MP 26 in ft/sec Step 2 - (Car B MP 28 in m/hr) x (predetermined multiplier M hr/m ft/sec) = car B MP 28 in ft/sec (It should be understood that it is not important whether step 1 (34) or step 2 (36) is done first.)

Step 3 - Distance Z / car B MP 28 in ft/sec = Time in seconds ($t_{nB}$) for car B to reach the finish line.

Step 4 - (car A MP 26 in ft/sec) x ($t_{nB}$ car B)= distance ($d_A$) car A will travel in time $t_{nB}$ Step 5 - (dA car A2) - (distance Z) = Optimal relative distance OD 24

Using the example Mps and track distances recited, here is an application.

Step 1 - [175.00 (MP)] x[ 1.47(M)] {256.67 (ft/s)}

Step 2 - [125.00 (MP)] x[ 1.47(M)] {183.33 (ft/s)}

Step 3 - [66.00 (ft)]/[183.33 (ft/s)] = [0.36 (sec)]

Step 4 - [256.67 (ft/s)x [0.36 sec = [92.39 (ft)]

Step 5 - [92.39 ft] - [66.00 ft] = [26.39ft (OD)]

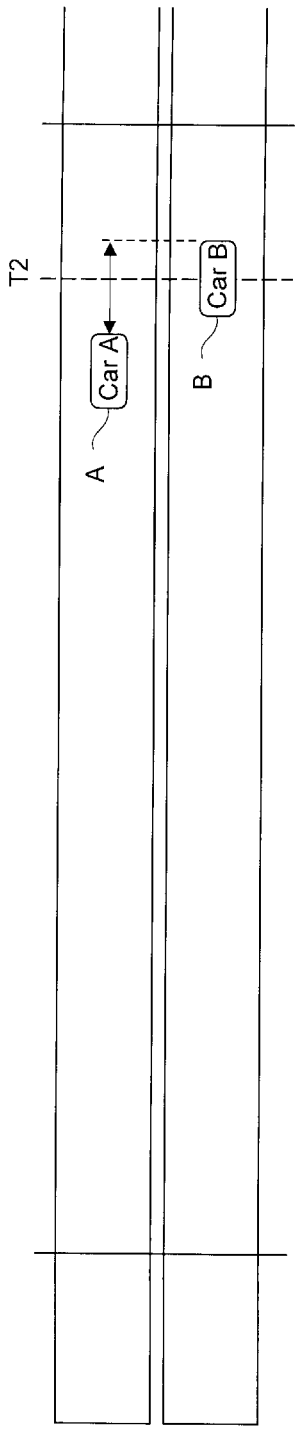

Fig. 3

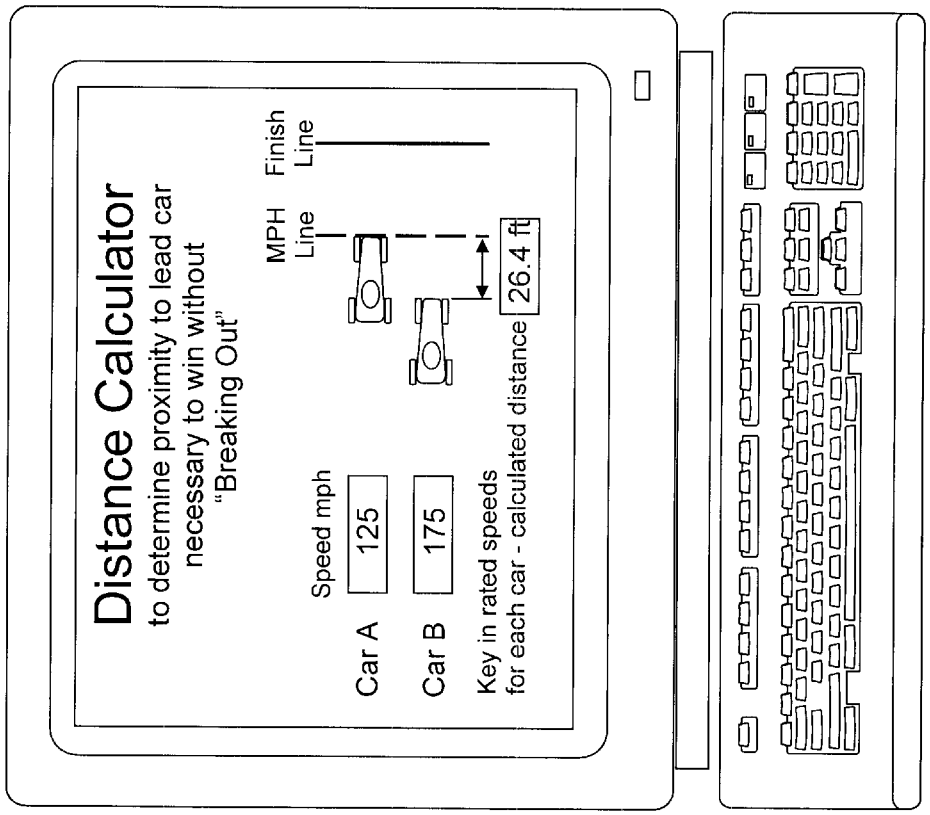
Fig. 5  Calculation system using desk top computer

METHOD AND DEVICE FOR GAUGING DISTANCE BETWEEN RACE CARS

BACKGROUND OF THE INVENTION

1. Field of Invention

This invention relates to the field of drag racing. More particularly the invention is directed to a method and apparatus for determining a desired distance between cars at a predetermined point of a race track in order to win a race.

2. Related Art

In the field of drag racing, drivers compete to cross a finish line first without, "breaking out." In other words, it is going too fast based upon the car's given performance capabilities. Traditionally, drag racing involved two cars starting at one end of a track and upon receiving a go signal, racing to a finish line with the first to cross winning the race.

Today, all cars are given a handicap rating. That is, slower cars are given a head start. With today's technology, the car's top speeds are determined and a head start time is calculated for the slower car. Drivers are penalized or disqualified for mistakes such as false starts or for running a faster elapsed or lower time than predicted. Thus, the object is to cross the finish line before your opponent, but at or above the predicted elapsed time top speed for your car.

A shift has occurred from the car's capabilities to the driver's capabilities. At speeds of between one hundred to two hundred miles per hour, for example, it is difficult to judge where your car should be relative to your opponent's car as you approach the finish line to win the race.

SUMMARY OF THE INVENTION

It is an object to aid drag racing driver's ability to win a drag race.

It is another object to provide a method and device which a driver can use to judge the relative distance between cars prior to the completion in order to win a drag race.

It is also an object to provide a method for determining an optimum distance between race cars at a predetermined point of a race track preceding a finish line.

Accordingly, the invention is directed to a method and apparatus for aiding drag racing drivers in determining the desired relative distance between cars at a predetermined point of the race track preceding a finish line. The method and device includes a first car speed input device, a second car speed input device, a manipulator operably associated with the devices to produce a predetermined distance between a first car and second car at a predetermined point before a finish line of a race track. The method and apparatus can include a display or a printout of the predetermined distance.

A method includes the steps of determining a first and second car's top speed wherein said second car's top speed is slower than the first car's top speed, determining the first car's time to travel a predetermined distance, determining the second car's time to travel the predetermined distance, using the times to determine a relative distance between the first and the second car at a point less than the predetermined distance.

Terminology

"Performance" is the time it should take a given car to reach the finish line given a predetermined maximum speed for the car.

"Proximity table" is a chart, slide-rule, dial, or the like which displays to a driver an optimal distance a first car and a second car should be separated at a predetermined point (typically a mile per hour line) preceding a finish line when the driver knows a first and second car's maximum performance.

BRIEF DESCRIPTION OF THE DRAWINGS

FIG. 3 represents a formula used in the present invention.

FIG. 5 shows a calculation device using the invention in a desktop computer.

DETAIL DESCRIPTION

Figure 1:
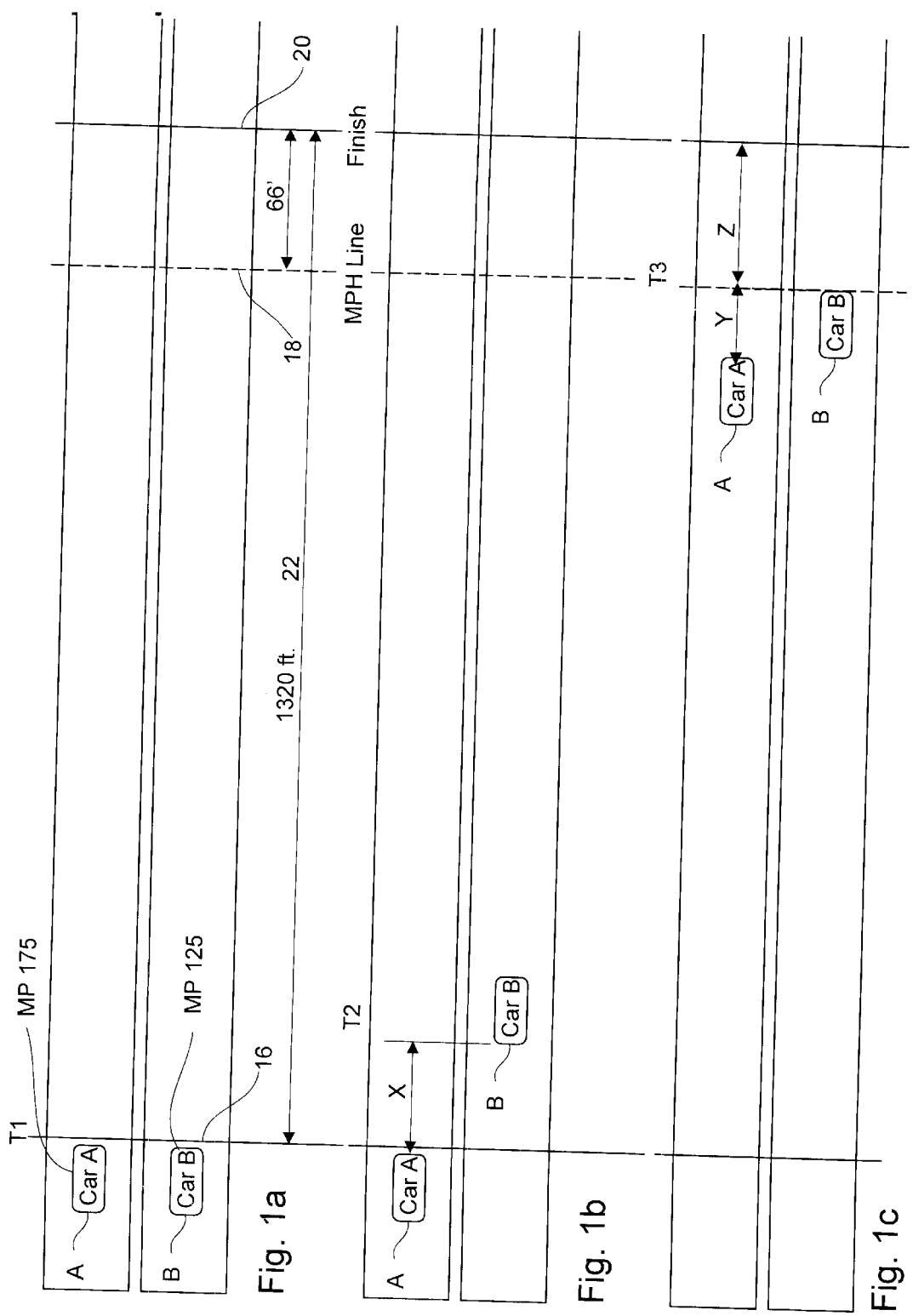
FIG. 1a is a drawing of a drag race track using the present invention at time T1.
FIG. 1b is a drawing of a drag race track using the present invention at time T2.
FIG. 1c is a drawing of a drag race track using the present invention at time T3.

Referring now to the drawings, FIGS. 1–5 illustrate the present invention which is directed to a method and apparatus 10 for aiding drag racers in determining optimum relative position of competing cars A and B in order to win a race. FIGS. 1a–1c visually illustrates the principles which are applied in the present invention wherein cars A and B have a predetermined maximum performance (MP) e.g., 175 miles per hour (mph) and 125 mph, respectively. MP is determined by averaging the speed of a car over the past races in which it participated. In FIG. 1a, T1 indicates that a first car A and a second car B are at the starting line 16 before any time has passed, and it has been predetermined the first car A is relatively faster than a second car B. Here, the race track 22 is predetermined to be a distance of 1320 feet. In FIG. 1b, T2 indicates that second car B has left the starting line while first car A has not because of a head start given to second car B to compensate for the variance between first car's A MP and second car's B MP. During the period of second car's B head start, second car B was able to travel a distance x in front of first car A. In FIG. 1c, T3 indicates that second car B has reached the mph line (mphL) 18, which here is predetermined to be 66 feet from the finish line 20. The distance z represents the distance from the mphL 18 to the finish line 20.

The first car A has narrowed the distance x achieved by second car B during said head start to a distance y which is less than distance x. It should be understood that the present invention can be adapted to changes in the current standard distances of the race track 22 and mphL 18. As will be further elaborated upon, the present invention uses predetermined values (e.g., such as standard race track distances, standard mphL distances, MPs, etc.) to present a race car driver with a useful tool in analyzing the necessary adjustments needed to be made during a race in order to win the race without exceeding the value of the NP at which his or her car is supposed to operate. Therefore, if and when predetermined values change, the present invention can adjust to offer the same useful information as in the preferred embodiment.

Under the same set of circumstances as illustrated by FIGS. 1a–1c, FIG. 2 illustrates a "drag race chart card" that may be used by a race car driver to quickly determine the number of feet 24 that second car B should lead first car A by at the time second car B reaches the mphL 18. The racer, by knowing the first car's A MP 26 (e.g., 175 mph) and the second car's B MP 28 (e.g., 125 mph) can follow the column 30 directly below the second car's B MP 28 (125 mph) and the row 32 directly right from the first car's A MP 26 (175 mph) to a point 24 where the two meet thus providing the optimal relative distance (OD) 24 (e.g., 26.6 ft). Converting to a measurement of distance such as feet permits a driver because a driver is able to quickly evaluate, based on the realized length of the competing car as compared to his or her own car, approximately how many feet he or she should be ahead or behind the competing car. For instance, a driver would not be able to gauge miles per hour or miles per second quickly enough to be useful. However, it should be understood that the present invention may alternatively be used to show the driver any other unit of measure found to be useful to the driver, such as meters.

Figure 2:
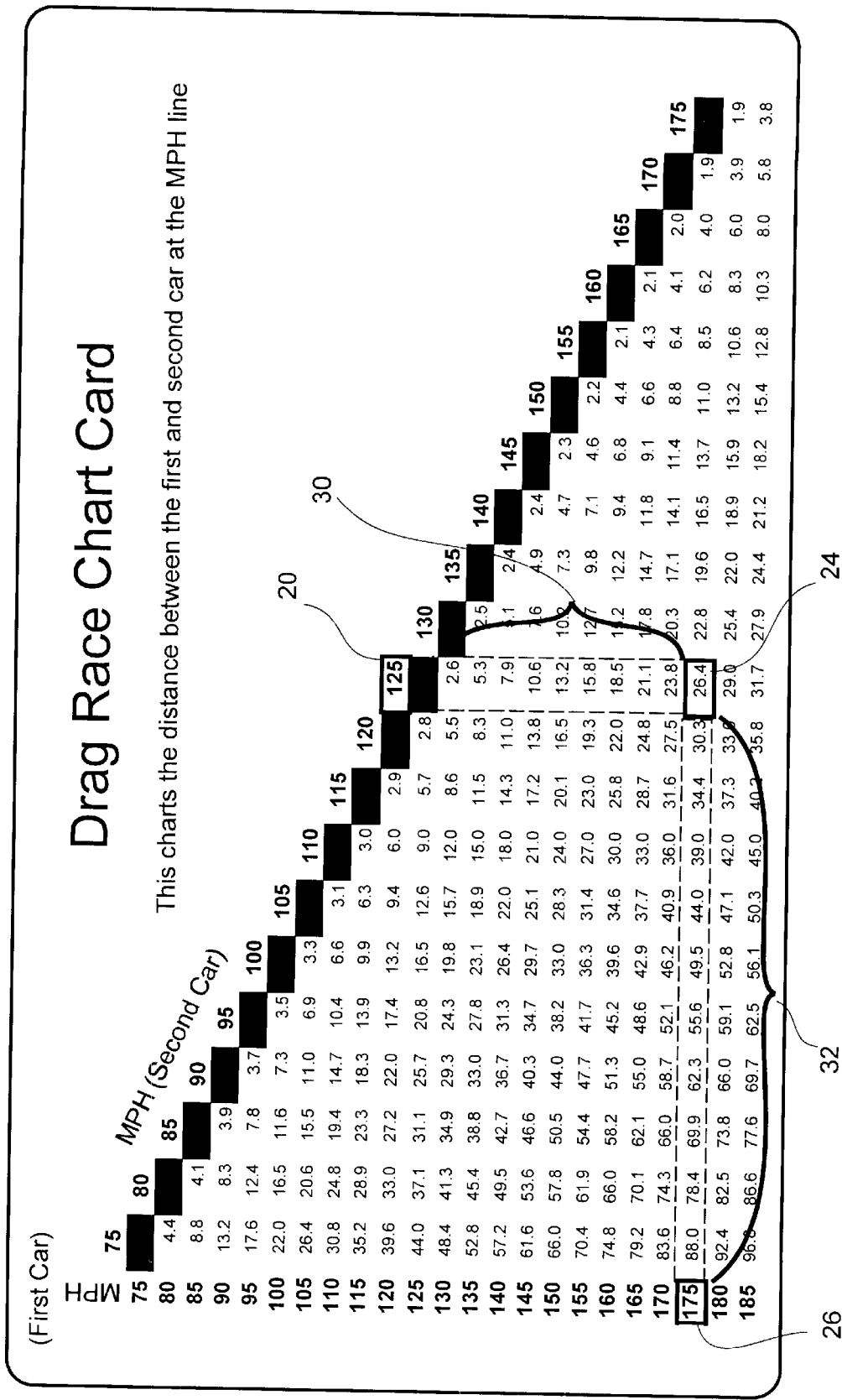
FIG. 2 represents a matrix using the invention in the form of a "drag race chart card."

Optimal relative distance 24 (OD) in feet, as shown in FIG. 2, is determined by several steps not shown on the drag race chart card 10. FIG. 3 illustrates the multiple steps to determine OD 24 using a first car's and second car's MP of 175 mph and 125 mph, respectively. The following formula is presented.

Step 1

$$(\text{car A MP 26 in m/hr}) \times (\text{predetermined multiplier M hr/m ft/sec}) = \text{car A MP 26 in ft/sec}.$$

Step 2

$$(\text{car B MP 28 in m/hr}) \times (\text{predetermined multiplier M hr/m ft/sec}) = \text{car B MP 28 in ft/sec}.$$

It should be understood that it is not important whether first step 34 or second step 36 is done first.

Step 3

$$\text{distance z car} \div \text{B MP 28 in ft/sec} = \text{time in seconds } (t_{sB}) \text{ for car B to reach finish line 20}$$

Step 4

$$(\text{car A MP 26 in ft/sec}) \times (t_{sB} \text{ car B}) = \text{distance } (d_A) \text{ car A will travel in time } t_{sB}$$

Step 5

$$(d_A \text{ car A}) - (\text{distance z}) = \text{optimal relative distance OD 24}$$

Using the example Mps, and track distances recited, here is an application.

Step 1

$$[175.00 \text{ (MP)}] \times [1.4666 \text{ (M)}] = [256.67 \text{ (ft/s)}]$$

Step 2

$$[125.00 \text{ (MP)}] \times [1.4666 \text{ (M)}] = [183.33 \text{ ft/s)}]$$

Step 3

$$[66.00 \text{ (ft)}] \div [183.33 \text{ (ft/s)}] = [0.36 \text{ (sec)}]$$

Step 4

$$[256.67 \text{ ft/s)}] \times [0.36 \text{ sec}] = [92.39 \text{ (ft)}]$$

Step 5

$$[92.39 \text{ ft}] - [66.00 \text{ ft}] = [26.39 \text{ ft (OD)}].$$

Figure 4:
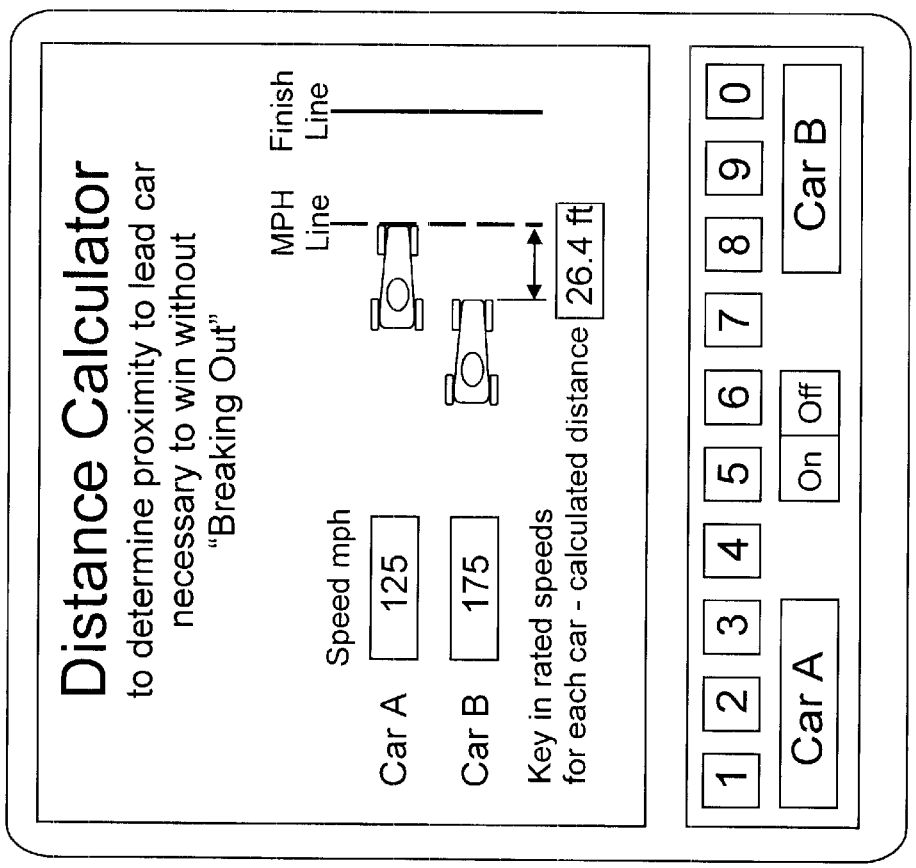
FIG. 4 shows a calculation device using the invention in an in-car computer.

There are several formats by which the OD 24 may be calculated and displayed. For instance, as illustrated in FIG. 4, a combination of basic hardware (e.g., processors, data storage devices, semiconductors, liquid crystal display units, keyboards, etc.) may be used to hold the software which enable the driver to input first car's MP and second car's MP resulting in the calculation of OD 24 which is displayed to the driver. In line with the in-car computer illustrated in FIG. 4, a desktop computer, as illustrated in FIG. 5, may likewise be used. A laptop, handheld, or like computer may also be used. In these applications, it is by way of the hardware utilizing the software that OD 24 is calculated.

Alternatively, charts (e.g., FIG. 2) may be utilized, whereby a driver may trace rows or columns of a first and second car's MP to ultimately find the OD. Dials, slide-rules, fold-charts, and the like may also be utilized, as long as the driver is somehow, by way of only knowing a first and second car's MP, lead to the OD. In these applications, several common ODs are calculated ahead of time for common MPs.

What is claimed is:

1. A method for enhancing a race car driver's ability to win a race without exceeding a maximum performance of a car, comprising:

determining an optimal distance by which a first car having a first performance should trail a second car having a second performance at a predetermined distance from a finish line on a race track having a fixed distance; and using said optimal distance during a race to influence a racer's, speed at such predetermined distance in order to win the race.

2. The method of claim 1, wherein a maximum performance of said cars is predetermined to be at a unit of measure different than a predetermined unit of measure for said race track and determining said optimal distance comprises:

(A) multiplying maximum performance in distance traveled over time of said first car by a multiplier to determine maximum performance in distance traveled over time having a common unit of measure with said race track;

(B) multiplying maximum performance in distance traveled over time of said second car by said multiplier to determine maximum performance in distance traveled over time having a common unit of measure with said race track; and wherein said second car is slower than said first car;

(C) dividing said predetermined distance from said finish line on said track by said maximum performance of said second car from step (B) to determine a time in which said second car should take to reach said finish line on said race track; and (D) multiplying said time from step (C) by said maximum performance of said first car to determine the distance said first car will travel and then subtracting said predetermined distance from said finish line to determine a distance which said first car should trail said second car to win said race without exceeding said cars' said maximum performances.

3. The method of claim 1, wherein said race car driver uses said optimal distance determined at said predetermined distance from said finish line to influence said racer's speed at said predetermined distance to win said race without exceeding the car's maximum performance.

4. The method of claim 2, wherein maximum performances of said cars are initially in miles per hour and said race track is measured in feet and wherein said steps are characterized as follows:

(A) multiplying said maximum performance in miles per hour of said first car by a multiplier to determine maximum performance in feet per second of said first car;

(B) multiplying said maximum performance in miles per hour of said second car, wherein said second car is slower than said first car;

(C) dividing said predetermined distance from said finish line on said race track in feet by said maximum performance in feet per second of said second car to determine a time in seconds which said second car should take to reach said finish line on said race track; and (D) multiplying said time from step (C) by said maximum performance in feet per second of said first car to determine the distance in feet said first car will travel and then subtracting said predetermined distance from said finish line in feet to determine a distance in feet which said first car should trail said second car to win said race without exceeding said cars'said maximum performances.

5. The method of claim 4, wherein calculating said maximum performance for said first car consists of averaging past single race maximum performances from at least one most recent prior race.

6. The method of claim 4, wherein calculating said maximum performance in feet per second of said second car consists of averaging past single race maximum performances from at least one most recent prior race.

7. The method of claim 4, wherein said multiplier is 1.466 (hours per mile multiplied by feet per second) and said predetermined distance from said finish line is 66 feet and said race track is 1,320 feet long.

8. The method of claim 5, wherein calculating said past single race maximum performances consists of determining a rate of time by which said first car traveled a race track having a fixed distance.

9. The method of claim 6, wherein calculating said past single race maximum performances consists of determining a rate by which said second car traveled a race track having a fixed distance.

10. The method of claim 6, wherein consecutive prior races are utilized.

11. The method of claim 8, wherein consecutive prior races are utilized.

12. A computing-based device to be used by racers for enhancing a race car driver's ability to win a race without exceeding a car's maximum performance, comprising:

means for obtaining a maximum performance of a first car;

means for obtaining a maximum performance of a second car;

means for determining an optimal distance said second car should trail said first car based on a predetermined distance from a finish line on a race track having a fixed distance and said second car having a lower maximum performance than said first car; and means for displaying said optional distance.

13. The device of claim 12, wherein said optimal distance determined at said predetermined distance from said finish line influences a racer's speed at said predetermined distance to win said race without exceeding the car's maximum performance.

14. A chart device to be used by racers for enhancing a race car driver's ability to win a race without exceeding a car's maximum performance, comprising:

means for indicating a maximum performance of a first car;

means for indicating a maximum performance of a second car, wherein an optimal distance said second car should trail said first car, based on a predetermined distance from a finish line on a race track having a fixed distance, and said second car having a lower maximum performance than said fist car, can be determined once said maximum performance of sad first car and said second car have been indicated; and means for displaying said optimal distance as a function of using said maximum performances.

15. The device of claim 14, wherein said optimal distance determined at said predetermined distance from said finish line influences a racer's speed at said predetermined distance to win said race without exceeding the car's maximum performance.

* * * * *